(12) United States Patent
Mizukami et al.

(10) Patent No.: US 7,701,481 B2
(45) Date of Patent: Apr. 20, 2010

(54) VIDEO MAGNIFER WITH IRRADIATING POINTER

(75) Inventors: Katsuya Mizukami, Nagoya (JP); Seiji Yamaguchi, Kawanishi (JP)

(73) Assignees: Elmo Co., Ltd., Aichi (JP); Times Corporation Ltd., Hyogo (JP)

(*) Notice: Subject to any disclaimer, the term of this patent is extended or adjusted under 35 U.S.C. 154(b) by 1117 days.

(21) Appl. No.: 10/852,810

(22) Filed: May 25, 2004

(65) Prior Publication Data
US 2005/0122396 A1   Jun. 9, 2005

(30) Foreign Application Priority Data
Dec. 9, 2003  (JP) ............................. 2003-410252

(51) Int. Cl.
*H04N 7/12* (2006.01)
(52) U.S. Cl. .............................. 348/63; 348/61; 348/62; 348/79; 348/80; 348/114; 348/128; 348/132; 348/207.99; 348/240.99; 345/62; 345/63; 345/130; 345/660
(58) Field of Classification Search ............. 348/61–63, 348/79, 80, 114, 128, 132, 207.88, 240.884; 345/62, 63, 130, 660
See application file for complete search history.

(56) References Cited

U.S. PATENT DOCUMENTS

| 3,816,646 | A | * | 6/1974 | Cinque ........................ 348/63 |
| 3,819,855 | A | | 6/1974 | Rush et al. |
| 4,928,170 | A | * | 5/1990 | Soloveychik et al. .......... 348/63 |
| 5,052,797 | A | * | 10/1991 | Madsen ....................... 353/28 |
| 5,212,567 | A | | 5/1993 | Kawai |
| 5,363,170 | A | * | 11/1994 | Muraki ........................ 355/67 |
| 6,300,975 | B1 | * | 10/2001 | Yamane ....................... 348/63 |
| 6,778,180 | B2 | * | 8/2004 | Howard et al. .............. 345/581 |
| 6,778,714 | B1 | * | 8/2004 | Kipman et al. .............. 382/313 |
| 6,791,600 | B1 | * | 9/2004 | Chan ........................... 348/63 |

FOREIGN PATENT DOCUMENTS

| EP | 0563541 A1 | 10/1993 |
| JP | 2000-333042 | 11/2000 |
| WO | WO 03/083805 | 10/2003 |

OTHER PUBLICATIONS

Office Action dated Jun. 24, 2008 issued from German Patent Office in corresponding DE patent application No. 10 2004 028 510.1-31 (and English Translation).

* cited by examiner

*Primary Examiner*—Andy S. Rao
*Assistant Examiner*—Geepy Pe
(74) *Attorney, Agent, or Firm*—Posz Law Group, PLC

(57) ABSTRACT

A video magnifier includes a body including a base, a table on which an object to be read is placed, the table being disposed on the base, a video camera disposed over the table, an illumination lamp illuminating the object placed on the table and a pointer irradiating a part of the object photographed by the video camera, and a monitor television displaying a video image delivered from the video camera. In the video magnifier, in synchronization with irradiation of the photographed part of the object by the pointer, an illuminance of the illumination lamp is rendered lower than an illuminance of the pointer.

18 Claims, 4 Drawing Sheets

F I G. 1
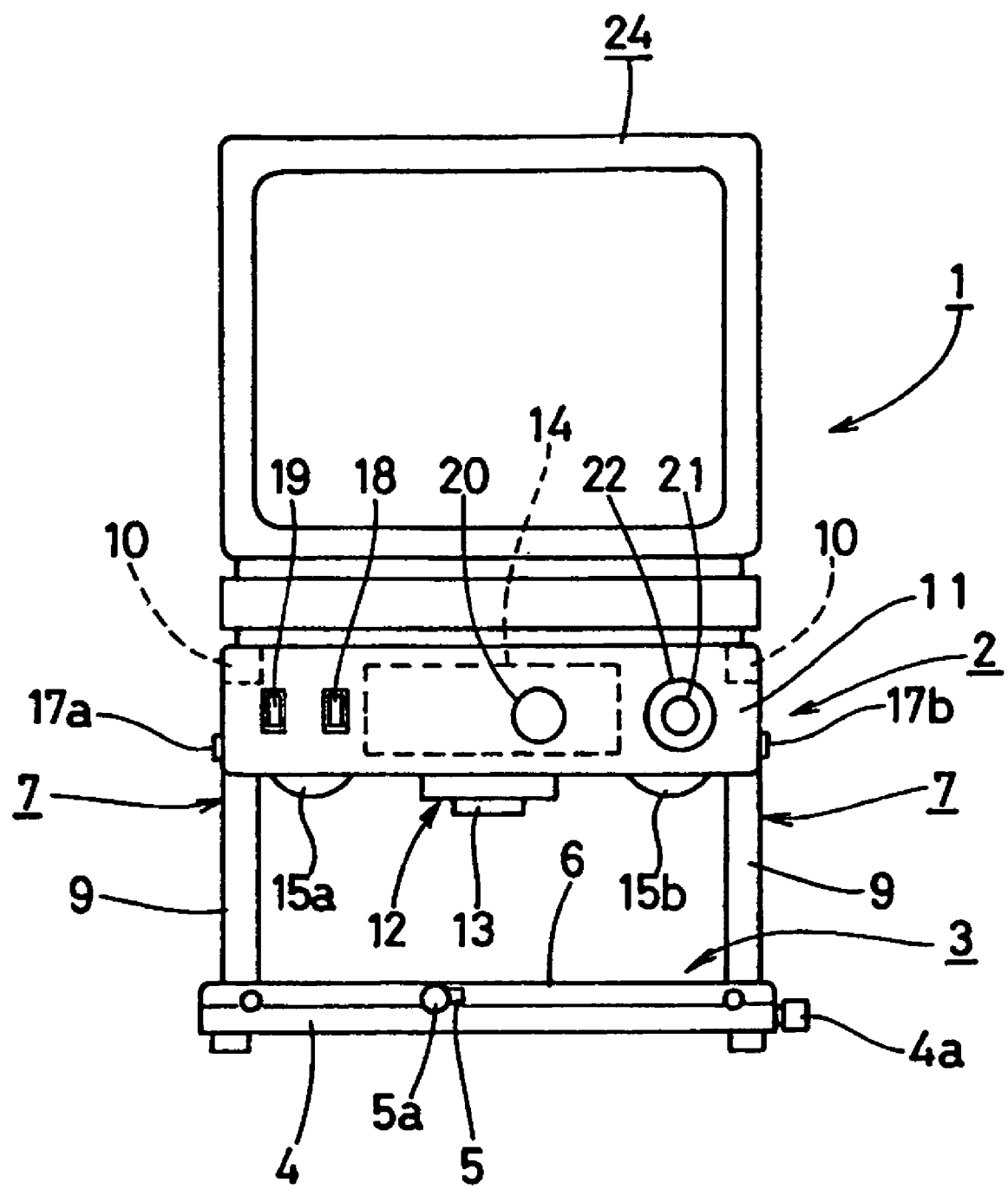

VIDEO MAGNIFER WITH IRRADIATING POINTER

BACKGROUND OF THE INVENTION

1. Field of the Invention

This invention relates to a video magnifier provided with an irradiating pointer which irradiates a part of an object placed on a table with light thereby to point a location corresponding to a magnified image on a monitor screen.

2. Description of the Related Art

One type of video magnifier has been provided with an irradiating pointer which irradiates a part of an object placed on a table with light thereby to point a location corresponding to a magnified image on a monitor screen. JP-A-2000-333042 discloses such a video magnifier with a pointer. Video magnifiers are generally directed to use by weak-sighted persons. An object to be read, such as newspaper, is placed on a table and illuminated by an illumination lamp.

However, the illumination by the illumination lamp tends to dazzle eyes of the weak-sighted persons. Accordingly, when both irradiation by the pointer and illumination by the illumination lamp are carried out simultaneously, the weak-sighted persons have a difficulty to confirm the location on the object irradiated by the pointer. As a result, when the video magnifier is used so that an object is read or an entry is made into the object, it is difficult to confine the location to be read within a photographing range. Thus, the conventional video magnifier has a low convenience.

Further, since most weak-sighted persons also have defective color vision, it is unsuitable to require determination by a color for confirmation of the irradiation location of the pointer. In this case, it is useful to require the determination by change in the brightness by flashing.

SUMMARY OF THE INVENTION

Therefore, an object of the present invention is to provide a video magnifier in which the weak-sighted persons can readily confirm the location irradiated by the pointer even when both irradiation by the pointer and illumination by the illumination lamp are carried out simultaneously.

The present invention provides a video magnifier comprising a body including a base, a table on which an object to be read is placed, the table being disposed on the base, a video camera disposed over the table, an illumination lamp illuminating the object placed on the table and a pointer irradiating a part of the object photographed by the video camera, and a monitor television displaying a video image delivered from the video camera, wherein in synchronization with irradiation of the photographed part of the object by the pointer, an illuminance of the illumination lamp is rendered lower than an illuminance of the pointer.

In the above-described video magnifier, the illuminance of the illumination lamp is rendered lower than that of the pointer in synchronization with irradiation of the photographing location by the pointer. Accordingly, since irradiation of the photographing location by the pointer is confirmed readily, the photographing location of the video camera can easily correspond with a part of the document to be read. Consequently, the convenience of the video magnifier can be improved.

In a preferred form, the pointer irradiates a predetermined region within a photographing range of the video camera. Consequently, the part of the document to be read can reliably be confined within the photographing range of the video camera.

In another preferred form, the table is movable back and forth, and right and left. Consequently, the location irradiated by the pointer can easily be caused to correspond with the part of the document to be read, whereupon the convenience of the video magnifier can be improved.

In further another preferred form, two illumination lamps are provided and spaced from each other right and left over the table so that the object is illuminated from two directions and either one of the illumination lamps is turned on. Consequently, since either one of the lamps is turned on by a suitable turn-over switch, a user can be prevented from being troubled by the shadow of his or her own hand in making an entry in the document whether he or she is right-handed or left-handed, for example.

In further another preferred form, a support arm is provided on the base, and the video camera, the illumination lamp or lamps and the pointer are housed in a casing. The casing is disposed over the table by the support arm, and the monitor television is disposed on an upper side of the casing. Consequently, the convenience of the video magnifier can be improved since movement of a look decreases between the irradiation position of the pointer and the screen of the monitor television. Further, the video magnifier can easily be transferred and installed since the monitor television detachably placed on the upper side of the casing.

BRIEF DESCRIPTION OF THE DRAWINGS

Other objects, features and advantages of the present invention will become clear upon reviewing the following description of the embodiment with reference to the accompanying drawings, in which:

FIG. 1 is a front view of the video magnifier in accordance with one embodiment of the present invention;

DETAILED DESCRIPTION OF THE INVENTION

Figure 2:
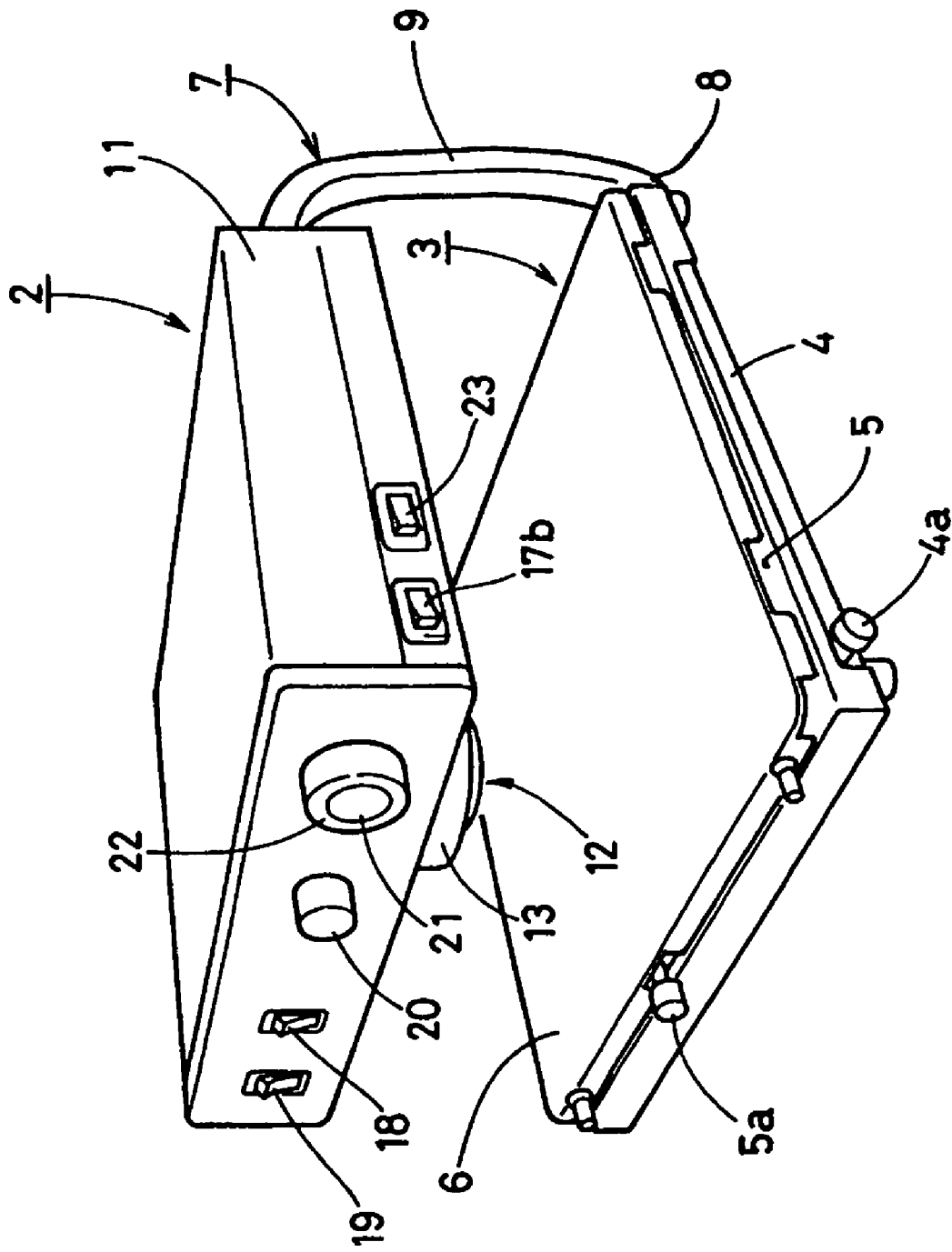
FIG. 2 is a perspective view of the video magnifier body.
Figure 3:
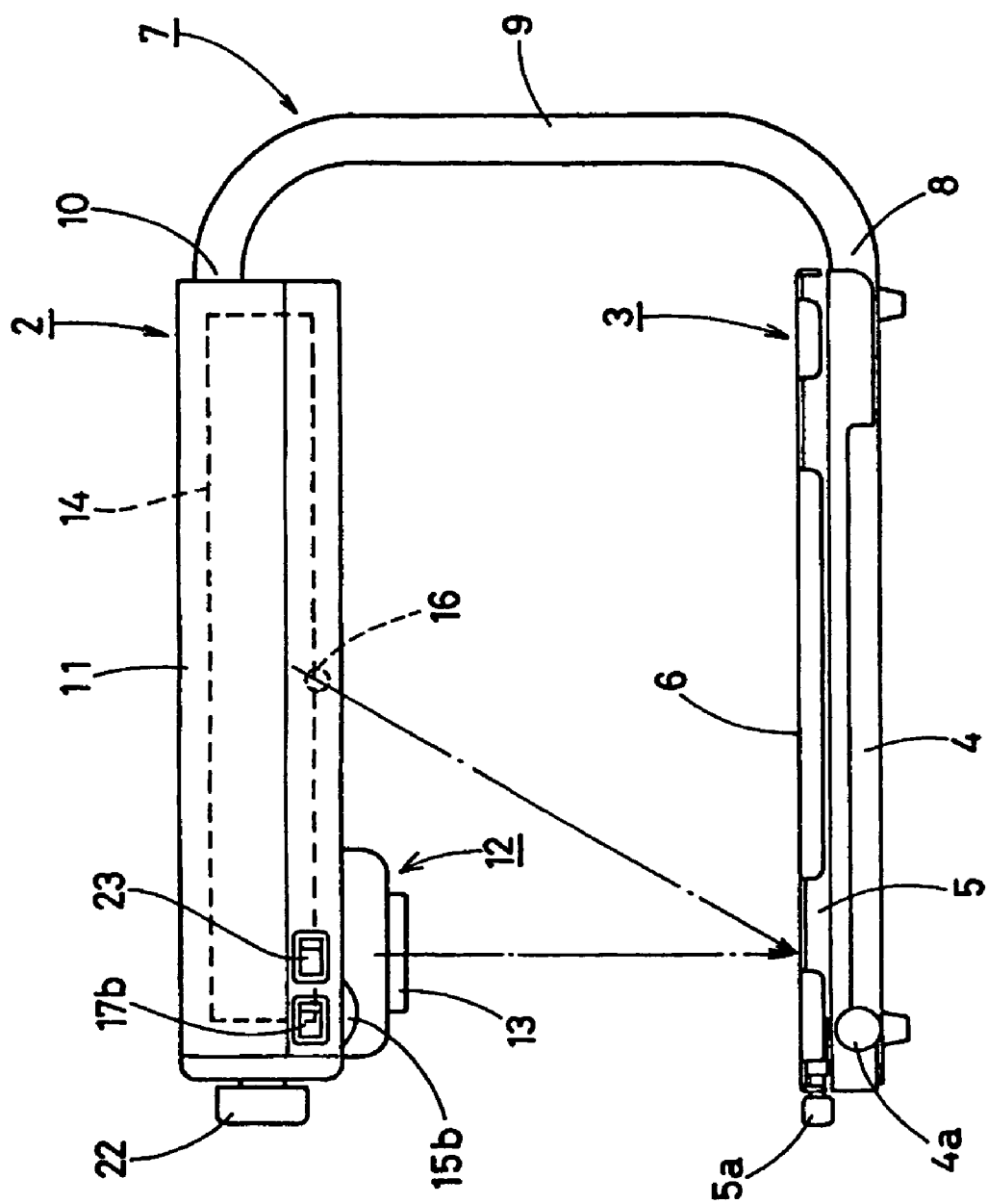
FIG. 3 is a side view of the video magnifier body.

One embodiment of the present invention will be described with reference to the drawings. Referring to the drawings, the video magnifier 1 of the embodiment includes a body 2 on which a table unit 3 is mounted. An object to be read is placed on the table unit 3. The table unit 3 includes an attachment plate 5 attached to a base 4 and a table 6 mounted on the attachment plate 5. The attachment plate 5 is moved back and forth by a cross slide (not shown) fixed to the base 4. The table 6 is further moved right and left by another cross slide (not shown) fixed to the attachment plate 5. A brake knob 4a is mounted on the base 4 for preventing back-and-forth movement of the attachment plate 5. Another brake knob 5a is mounted on the attachment plate 5 for preventing right-and-left movement of the table 6. Accordingly, when an installation surface for the video magnifier 1 is inclined or when the video magnifier body 2 is shipped or otherwise conveyed, the attachment plate 5, table 6 and the like can be prevented from movement.

Mount bases 8 for support arms 7 are fixed to right and left ends of the underside of the base 4 respectively. Each support arm 7 includes a vertical portion 9 standing upright from the rear end of the mount base 8. Each support arm 7 further includes a forwardly extending horizontal support 10 formed by bending an upper end of the vertical portion 9. A camera casing 11 is supported by the horizontal support 10 so as to be fixed over the table 6.

A video camera 12 and a control circuit 14 are housed in the camera casing 11, and two illumination lamps 15*a* and 15*b*, and an LED irradiation lamp 16 serving as a pointer are mounted on the camera casing 11. The video camera 12 includes a lens tube 13 projecting from the underside of the camera casing 11. Thus, the video camera 12 is directed substantially vertically downward. The control circuit 14 includes a change-over circuit 25 which will be described later. The control circuit 14 controls the video camera 12 based on predetermined switch input and further controls the illumination lamps 15*a* and 15*b* and the LED irradiation lamp so that these lamps are turned on and off.

The illumination lamps 15*a* and 15*b* are mounted on left and right ends of the underside of the camera casing 11 respectively. The illumination lamps 15*a* and 15*b* illuminate the upper side of the table 6. The illumination lamps 15*a* and 15*b* are tuned on and off by lamp switches 17*a* and 17*b* mounted on the left and right sides of the camera casing 11. Further, the LED irradiation lamp 16 is positioned so as to irradiate substantially the central photographing range of the video camera 12 located over the table 6. The LED irradiation lamp 16 is turned on and off by an operation button 18 mounted on the front of the camera casing 11.

On the front of the casing 11 are further mounted a power switch 19, a screen switching/contrast adjusting knob 20, a zooming knob 22 with a central autofocusing button 21 and the like. A focusing switch 23 is provided inside the lamp switch 17*b* of the illumination lamp 15*a* and 15*b*. The underside of the camera casing 11 is provided with a power supply cable, a video output terminal, an AC outlet, a ground terminal none of which are shown. A monitor television 24 is fixed to the top of the camera casing 11 by a fastening band or fastening screws, as shown in FIG. 1.

Figure 4:
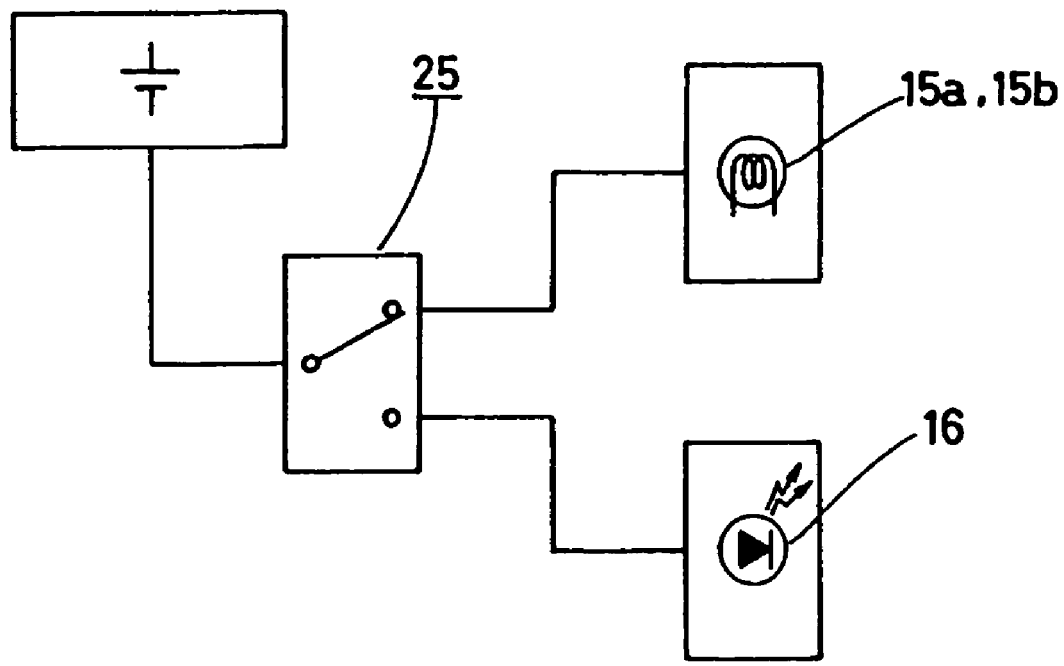
FIG. 4 is a schematic block diagram showing a switching circuit for an illumination lamp and an LED irradiation lamp.
Figure 5:
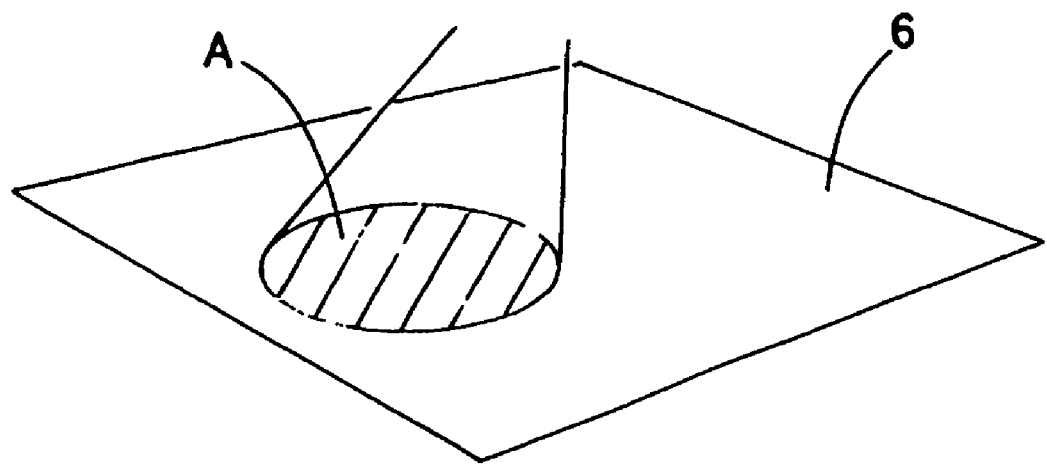
FIG. 5 schematically illustrates an irradiated region.

When the operation button 18 turns on the LED irradiation lamp 16 during turn-on of the illumination lamps 15*a* and 15*b*, a switching circuit 25 turns off the illumination lamps 15*a* and 15*b* in synchronization with turn-on of the LED irradiation lamp 16, as shown in FIG. 4. In this case, the illuminance of each illumination lamp 15*a* or 15*b* may be decreased so as to be lower than that of the LED irradiation lamp 16, instead. Further, a predetermined region A within a photographing range of the video camera 12 may be irradiated by the LED irradiation lamp 16, as shown in FIG. 5.

In the foregoing video magnifier 1, the object to be read, such as a book, document or the like, is placed on the table 6 and then illuminated by the illumination lamps 15*a* and 15*b*. The object in this state is photographed by the video camera 12 thereby to be displayed in a magnified scale on the monitor television 24. In this case, when the operation button 18 is operated so that the LED irradiation lamp 16 is turned on, the switching circuit 25 turns off the illumination lamps 15*a* and 15*b* in synchronization with turn-on of the LED irradiation lamp 16. The LED irradiation lamp 16 irradiates substantially the central part of the photographing range of the video camera 12 or the predetermined region A. Accordingly, the attachment plate 5 and the table 6 are moved back and forth, and right and left on the basis of the irradiated region A so that a part of the object to be read comes within the photographing range of the video camera 12.

The illumination lamps 15*a* and 15*b* are turned off in synchronization with irradiation of a photographing location of the video camera 12 by the pointer or LED irradiation lamp 16. Thus, the irradiation location can readily be confirmed on the basis of the light irradiated only by the LED irradiation lamp 16. Consequently, since the part of the object to be read can easily correspond with the photographing location of the video camera 12, the convenience of the video magnifier 1 can be improved for weak-sighted persons.

Furthermore, the predetermined region A in the photographing range of the video camera 12 is irradiated by the LED irradiation lamp 16, whereby the location of the part of the object to be read can readily be caused to come within the photographing range of the video camera 12 reliably and quickly. Further, since the table 6 on which the object to be read is placed is moved back and forth, and right and left, the photographing location of the video camera 12 can easily be caused to correspond with the part of the object to be read. Consequently, the convenience of the video magnifier 1 can be improved.

Furthermore, the video magnifier 1 includes two illumination lamps 15*a* and 15*b* located on the right and left of the table 6 over the table 6 respectively. Both of them can be turned on simultaneously and either one of them can be turned on. Consequently, the user can be prevented from being troubled by the shadow of his or her own hand in making an entry in the document serving as the object whether he or she is right-handed or left-handed.

Additionally, the video camera 12, the control circuit 14, the illumination lamps 15*a* and 15*b* and the LED irradiation lamp 16 are housed in the camera casing 11. The camera casing 11 is disposed over the table by the horizontal support 10 of the support arm 7, and the monitor television 25 is disposed on the top of the camera casing 11. Consequently, the convenience of the video magnifier 1 can be improved since movement of a look decreases between the irradiation location of the LED irradiation lamp 16 and the screen of the monitor television 24. Further, the monitor television 24 mounted on the top of the camera casing 11 can be detached. Thus, the video magnifier 1 can easily be transferred and installed.

The foregoing description and drawings are illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A video magnifier comprising:
    a body including a base, a table on which an object to be read is placed, the table being disposed on the base, a video camera disposed over the table and configured to photograph the object being placed on the table, an illumination lamp configured to illuminate substantially an upper side of the table and the object being placed on the table, and a pointer configured to irradiate a predetermined region within a central photographing range being photographed by the video camera; and
    a monitor television displaying a video image delivered from the video camera, and
    a means for turning off the illumination lamp in synchronization with the pointer being turned on, responsive to the pointer being turned on while the illumination lamp is already on, the pointer being turned on to project a single beam of light to irradiate the predetermined region in the central photographing range.

2. A video magnifier according to claim 1, wherein the pointer irradiates a substantially same region as the video camera photographs.

3. A video magnifier according to claim 1, wherein the table is movable back and forth, and right and left.

4. A video magnifier according to claim 2, wherein the table is movable back and forth, and right and left.

5. A video magnifier according to claim 1, wherein two illumination lamps are provided and spaced from each other over the table so that the object is illuminated from two directions and either one of the illumination lamps is turned on.

6. A video magnifier according to claim 2, wherein the two illumination lamps are provided and spaced from each other over the table so that the object is illuminated from two directions and either one of the illumination lamps is turned on.

7. A video magnifier according to claim 3, wherein the two illumination lamps are provided and spaced from each other over the table so that the object is illuminated from two directions and either one of the illumination lamps is turned on.

8. A video magnifier according to claim 4, wherein the two illumination lamps are provided and spaced from each other over the table so that the object is illuminated from two directions and either one of the illumination lamps is turned on.

9. A video magnifier according to claim 1, further comprising a support arm provided on the base, wherein the video camera, at least one illumination lamp and the pointer are housed in a casing, the casing is disposed over the table by the support arm, and the monitor television is disposed on an upper side of the casing.

10. A video magnifier according to claim 2, further comprising a support arm provided on the base, wherein the video camera, at least one illumination lamp and the pointer are housed in a casing, the casing is disposed over the table by the support arm, and the monitor television is disposed on an upper side of the casing.

11. A video magnifier according to claim 3, further comprising a support arm provided on the base, wherein the video camera, at least one illumination lamp and the pointer are housed in a casing, the casing is disposed over the table by the support arm, and the monitor television is disposed on an upper side of the casing.

12. A video magnifier according to claim 4, further comprising a support arm provided on the base, wherein the video camera, at least one illumination lamp and the pointer are housed in a casing, the casing is disposed over the table by the support arm, and the monitor television is disposed on an upper side of the casing.

13. A video magnifier according to claim 5, further comprising a support arm provided on the base, wherein the video camera, at least one illumination lamp and the pointer are housed in a casing, the casing is disposed over the table by the support arm, and the monitor television is disposed on an upper side of the casing.

14. A video magnifier according to claim 6, further comprising a support arm provided on the base, wherein the video camera, at least one illumination lamp and the pointer are housed in a casing, the casing is disposed over the table by the support arm, and the monitor television is disposed on an upper side of the casing.

15. A video magnifier according to claim 7, further comprising a support arm provided on the base, wherein the video camera, at least one illumination lamp and the pointer are housed in a casing, the casing is disposed over the table by the support arm, and the monitor television is disposed on an upper side of the casing.

16. A video magnifier according to claim 8, further comprising a support arm provided on the base, wherein the video camera, at least one illumination lamp and the pointer are housed in a casing, the casing is disposed over the table by the support arm, and the monitor television is disposed on an upper side of the casing.

17. A video magnifier according to claim 1,
said pointer being an irradiation lamp,
further comprising an operation button configured to turn and keep on the irradiation lamp in response to manual operation of the operation button, and
the means for turning off the illumination lamp being a switching circuit switching the illumination lamp off and the irradiating lamp on in response to the operation button being operated.

18. A video magnifier according to claim 17, wherein the switching circuit is electrically connected between the illumination lamp and the irradiating lamp.

* * * * *